US011034026B2

(12) United States Patent
Tan et al.

(10) Patent No.: US 11,034,026 B2
(45) Date of Patent: Jun. 15, 2021

(54) UTILIZING OPTICAL DATA TO DYNAMICALLY CONTROL OPERATION OF A SNAKE-ARM ROBOT

(71) Applicant: General Electric Company, Schenectady, NY (US)

(72) Inventors: Huan Tan, Clifton Park, NY (US); Xiao Bian, Glenville, NY (US); Todd Danko, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 337 days.

(21) Appl. No.: 16/245,017

(22) Filed: Jan. 10, 2019

(65) Prior Publication Data
US 2020/0223069 A1  Jul. 16, 2020

(51) Int. Cl.
*B25J 9/16* (2006.01)
*B25J 13/00* (2006.01)
(Continued)

(52) U.S. Cl.
CPC ............. *B25J 13/006* (2013.01); *B25J 5/007* (2013.01); *B25J 9/1697* (2013.01); *B25J 17/025* (2013.01)

(58) Field of Classification Search
USPC .................................................. 700/245–264
See application file for complete search history.

(56) References Cited

U.S. PATENT DOCUMENTS 5,737,500 A * 4/1998 Seraji ...................... B25J 9/1643
                                                                                318/568.11
7,171,279 B2   1/2007 Buckingham et al.
(Continued)

FOREIGN PATENT DOCUMENTS

| CN | 204076245 U | 1/2015 |
|----|-------------|--------|
| CN | 103479320 B | 8/2015 |
| CN | 104925159 B | 6/2017 |

OTHER PUBLICATIONS

Hasanabadi, E. et al., "Trajectory Tracking of a Planar Snake Robot Using Camera Feedback", IEEE Xplore, Dec. 27, 2011, 4pgs.
(Continued)

*Primary Examiner* — Jonathan L Sample
(74) *Attorney, Agent, or Firm* — Dority & Manning, P.A.

(57) ABSTRACT

Methods and systems for controlling a snake-arm robot. In an embodiment, a server computer receives real-time image data associated with at least one of an operating environment and a location of a workpiece from an optical sensor mounted on a robot head of a snake-arm robot, and receives, input data describing a desired pose of the robot head from a user device. The server computer then computes a desired velocity of the robot head using an image Jacobian, translates the desired velocity of the robot head into incremental displacement data and rotation data within a control cycle, computes a position of each of a plurality of links comprising a snake-arm of the snake-arm robot to follow motion of the robot head, computes a current position of each of the plurality of links utilizing a forward dynamics model, and computes force and torque data required to move at least one of a plurality of joints connecting the links to move the snake-arm robot to the desired pose. The method also includes generating movement instructions based on the force and torque data, and transmitting the movement instructions to at least one of a drive motor associated with an introduction device and a plurality of controllers associated with servo-motors operably connected to joints connecting the links of the snake arm causing the robot head to move to the desired pose.

20 Claims, 4 Drawing Sheets

(51) Int. Cl.
*B25J 5/00* (2006.01)
*B25J 17/02* (2006.01)

(56) References Cited

U.S. PATENT DOCUMENTS

| | | |
|---|---|---|
| 8,374,722 B2 | 2/2013 | Buckingham et al. |
| 9,294,737 B2 | 3/2016 | Hatcher, Jr. et al. |
| 9,956,042 B2* | 5/2018 | Simaan .................. A61B 34/30 |
| 2010/0152899 A1* | 6/2010 | Chang .................... B25J 9/1682 |
| | | 700/262 |
| 2010/0234999 A1* | 9/2010 | Nakajima .............. B25J 9/1628 |
| | | 700/261 |
| 2011/0184241 A1* | 7/2011 | Zubiate .................. A61B 34/30 |
| | | 600/141 |
| 2012/0158179 A1* | 6/2012 | Ooga .................... B25J 9/1633 |
| | | 700/259 |
| 2013/0296885 A1* | 11/2013 | Desai ................. A61B 17/3421 |
| | | 606/130 |
| 2014/0121837 A1* | 5/2014 | Hashiguchi ............ B25J 9/1633 |
| | | 700/261 |
| 2014/0195054 A1* | 7/2014 | Kamiya .................. B25J 13/06 |
| | | 700/263 |
| 2014/0330432 A1* | 11/2014 | Simaan .................. A61B 34/35 |
| | | 700/250 |
| 2016/0303739 A1* | 10/2016 | Apkarian .................... B25J 3/04 |
| 2017/0361470 A1 | 12/2017 | Otero Del Real et al. |
| 2018/0021094 A1* | 1/2018 | Matsuda ................ A61B 90/36 |
| | | 600/102 |
| 2018/0021945 A1 | 1/2018 | Pettersen et al. |
| 2019/0358813 A1* | 11/2019 | Graham ................ B25J 18/02 |
| 2020/0223069 A1* | 7/2020 | Tan ........................ B25J 13/006 |

OTHER PUBLICATIONS

Delisle, Jean-Jacques, "How this snake-like robot with vision systems and laser cutters helps repair aircraft engines", Electronic Products, Sep. 11, 2017, 4pgs.

* cited by examiner

UTILIZING OPTICAL DATA TO DYNAMICALLY CONTROL OPERATION OF A SNAKE-ARM ROBOT

BACKGROUND

Snake-arm robots have flexible simulated environment and continuous constructions that are long and slender and have articulations along their length so that the snake-arm robot can bend like a snake. Features typically associated with snake-arm robots include having a self-supporting arm that has a continuous diameter along its length, and having the arm being tendon-driven and being controlled by an operator (i.e., a human operator observing the snake-arm robot and using a control device, such as a controller having one or more joysticks and/or control buttons, to do the work). Due to their shape and control characteristics, snake-arm robots are typically used to access and perform work in confined spaces.

Snake-arm robots have also been described as "continuum" robots and/or "elephant's trunk" robots, but these descriptions can be restrictive in their definitions and thus are not applicable to all snake-arm robots. A continuum robot is a continuously curving manipulator, much like the arm of an octopus. In contrast, an elephant's trunk robot is a specific type of continuum robot generally associated with whole arm manipulation, wherein the entire arm can be used to grasp and manipulate objects in the same way that an elephant would pick up an object. Accordingly, a snake-arm robot should not be confused with a "snakebot," which is a robot that mimics the biomorphic motion of a snake in order to move or slither along the ground. As this field of robotics is still an emerging field there does not yet appear to be full agreement on the best term for the snake-arm class of robot.

Snake-arm robots are often used in association with an introduction device that introduces the snake-arm into a confined space. For example, a snake-arm robot may be mounted onto a remote-controlled vehicle or may be mounted onto an industrial robot (that can be used as the introduction device). In such cases, the shape of the arm is coordinated with the linear movement of the introduction device axis enabling an operator to control the arm and the robot head of the snake-arm robot to follow a path into a workspace or confined space to function and/or do work.

The ability of snake-arm robots to pass through small apertures and move through cluttered environments and/or reach into confined spaces allows such robots to be utilized in many applications involving access problems. For example, a snake-arm robot can be used to work in confined spaces in industrial environments or hazardous environments, such as in a nuclear power plant. In addition, a snake-arm robot can carry or be equipped with various types of tools and/or robot heads designed to do work. For example, a robot head of a snake-arm robot may include one or more tools such as a laser to cut metal or other materials, a welding tool to join metal parts together, a high-pressure water jet or chemical sprayer to clean surfaces or parts, cameras for visual inspections (for example, within a pipe), and/or measuring devices to measure and/or look at complex surfaces. Thus, a snake-arm robot may be utilized to inspect, repair and/or maintain parts in a nuclear power plant, manufacture or assemble parts inside a wing box and/or a jet engine of an airplane, assemble various parts of an automobile, or perform a bomb-disposal activity or other anti-terrorism task. Snake-arm robots have also been developed for control by surgeons to perform minimally invasive surgery, such as endoscopic surgery and/or neurosurgery.

As discussed above, conventional snake-arm robots are controlled by human operators to do work. Various types of work operations require sensory feedback signals from the environment and/or from the robotic body to maintain configurations and/or to ensure the satisfactory performance of snake-arm robot operations. However, many types of snake-arm robots do not include rotary encoders (also known as shaft encoders) on their bodies, which are electro-mechanical devices that convert the angular position or motion of a shaft or axle to analog or digital output signals, because rotary encoders are expensive. Instead, human operators observe and control movement of such snake-arm robots. Since closed-loop control of the entire body of snake-arm robots which do not employ encoders is not straightforward, in some cases visual information is provided by camera-like sensors mounted on the snake-arm robot to provide some feedback to the operator from the task space so that the work can be performed. However, it is not possible to directly map the image data fed back to the operator from the visual sensor(s) into joint space, which is the set of joint parameters describing the overall configuration of the snake-arm robot, as encoders are not available. Normally, a dynamics model is used for open-loop control of a snake-arm robot. However, an "imperfect" dynamics model will generate more uncertainties in the control process.

In view of the above comments, the inventors recognized that it would be desirable to provide methods and/or apparatus that can utilize visual data from inexpensive cameras or optical sensors along with data generated by preliminary dynamics models to automatically provide closed-loop control of a snake-arm robot. The optical sensory information also provides an extra source of information for robots to connect the motion with motor controls.

SUMMARY

An embodiment may include a method for controlling a snake-arm robot wherein a server computer receives real-time image data associated with at least one of an operating environment and a location of a workpiece from at least one optical sensor mounted on a robot head of a snake-arm robot, receives input data describing a desired pose of the robot head from a user device, computes a desired velocity of the robot head using an image Jacobian based on the difference between the desired pose and the real-time image data, and translates, the desired velocity of the robot head into incremental displacement data and rotation data within a control cycle based on the image data and the input data. The process also includes the server computer computing a position of each of a plurality of links that form a snake-arm of the snake-arm robot to follow motion of the robot head, computing a current position of each of the plurality of links utilizing a forward dynamics model, and computing, using an incremental dynamics model, force and torque data required to move at least one of a plurality of joints connecting the links to move the snake-arm robot to the desired pose. Next, the server computer generates movement instructions based on the force and torque data, and then transmits the movement instructions to at least one of a drive motor associated with an introduction device and a plurality of controllers associated with servo-motors operably connected to joints connecting the links of the snake arm causing the robot head to move to the desired pose.

In some embodiments, the method may also include, prior to computing a desired velocity of the robot head using an image Jacobian, the server computer extracting feature data from the real-time image data and desired image data associated with the desired pose of the robot head, and refining, utilizing a feature refinement process, an estimated pose of the robot head. In implementations, refining the estimated pose of the robot head may include re-estimating the estimated pose of the robot head and/or removing false detected features. In addition, in some embodiments the extracted feature data may include one or more of basic features data, pose estimation data, complex features data and semantic features data. In an implementation, the optical sensor may be an RGB sensor.

Another embodiment relates to a dynamically controlled snake-arm robot system, which includes a user device and a snake arm robot. In some implementations, the snake arm robot includes a vehicle having a drive motor, a snake arm operably connected to the vehicle, and a server computer connected to the vehicle. The snake arm may include a plurality of links, controllers, joints, servomotors, and a robot head, and in an implementation the robot head also may include an optical sensor and a tool mounted thereon. The server computer is operably connected to the drive motor and to the plurality of controllers, and includes a storage device storing computer-executable instructions which cause the server computer to receive real-time image data associated with at least one of an operating environment and a location of a workpiece from the at least one optical sensor mounted on the robot head, receive input data from the user device describing a desired pose of the robot head, compute a desired velocity of the robot head using an image Jacobian based on the difference between the desired pose and the real-time image data, and translate, based on the image data and the input data, the desired velocity of the robot head into incremental displacement data and rotation data within a control cycle. In addition, the stored computer executable instructions cause the server computer to compute a position of each of the plurality of links to follow motion of the robot head, compute a current position of each of the plurality of links utilizing a forward dynamics model, compute, using an incremental dynamics model, force and torque data required to move at least one of the plurality of joints connecting the links to move the snake-arm robot to the desired pose. The stored computer executable instructions then cause the server computer to generate movement instructions based on the force and torque data, and transmit the movement instructions to at least one of the drive motor of the vehicle and to the plurality of controllers associated with servo-motors of the snake arm causing the robot head to move to the desired pose.

Embodiments of the system may include an RGB sensor as the optical sensor, and the user device may be a laptop computer, a tablet computer or a mobile telephone. In some implementations, the storage device of the server computer may include further computer executable instructions, prior to the computer executable instructions for computing a desired velocity of the robot head using an image Jacobian, causing the server computer to extract feature data from the real-time image data and desired image data associated with the desired pose of the robot head, and then refine, utilizing a feature refinement process, an estimated pose of the robot head. In an implementation, the computer executable instructions for refining the estimated pose of the robot head includes computer executable instructions causing the server computer to re-estimate the estimated pose of the robot head and/or to remove false detected features. In addition, the computer executable instructions for extracting feature data may include computer executable instructions causing the server computer to extract one or more of basic features data, pose estimation data, complex features data and semantic features data.

Another embodiment relates to a non-transitory, computer-readable medium storing computer executable instructions that, when executed by a computer processor, causes dynamic control of a snake-arm robot. In some embodiments, the process includes the computer processor receiving real-time image data associated with at least one of an operating environment and a location of a workpiece from at least one optical sensor mounted on a robot head of a snake-arm robot, receiving input data from a user device describing a desired pose of the robot head, computing a desired velocity of the robot head using an image Jacobian based on the difference between the desired pose and the real-time image data, and translating, based on the image data and the input data, the desired velocity of the robot head into incremental displacement data and rotation data within a control cycle. The process also includes the computer processor computing a position of each of a plurality of links comprising a snake-arm of the snake-arm robot to follow motion of the robot head, computing a current position of each of the plurality of links utilizing a forward dynamics model, and computing, using an incremental dynamics model, force and torque data required to move at least one of a plurality of joints connecting the links to move the snake-arm robot to the desired pose. Next, the process includes the computer processor generating movement instructions based on the force and torque data, and transmitting the movement instructions to at least one of a drive motor associated with an introduction device and a plurality of controllers associated with servo-motors operably connected to joints connecting the links of the snake arm causing the robot head to move to the desired pose.

A technical advantage of embodiments disclosed herein includes significantly improving the performance of a snake arm robotic system by automatically providing control data for moving a snake-arm robot to locate a target and closes the control loop for robust and accurate operations. Specifically, the disclosed visual serving control loop advantageously increases the performance of the system by taking external feedback into the control, which also beneficially improves the overall accuracy of the system. In addition, the disclosed methods use external image information to close the control loop and provide an incremental dynamics model, which advantageously enables the snake-arm robot to perform many different types of operations in different environments. Another technical advantage over conventional snake-arm robots is that use of the processes disclosed herein do not require the snake arm robot to be calibrated, which saves significant time and costs for customers. Yet another technical advantage is that the system level design described herein can be utilized with conventional snake-arm robots (that do not include encoders) for many types of commercial applications including, but not limited to, visual information-based operations such as repairing aircraft engines, maintaining industrial equipment, transporting materials within confining environments, manufacturing parts, and the like.

BRIEF DESCRIPTION OF THE DRAWINGS

Features and advantages of some embodiments of the present disclosure, and the manner in which the same are accomplished, will become more readily apparent upon consideration of the following detailed description taken in conjunction with the accompanying drawings, which illustrate exemplary embodiments and which are not necessarily drawn to scale, wherein.

DETAILED DESCRIPTION

In the following detailed description, numerous specific details are set forth in order to provide a thorough understanding of embodiments. However, it will be understood by those of ordinary skill in the art that some of the embodiments may be practiced without these specific details in accordance with the present disclosure. In other instances, well-known methods, procedures, components and circuits have not been described in detail so as not to obscure the embodiments.

In general, and for the purpose of introducing concepts of novel embodiments disclosed herein, presented are methods for controlling snake-arm robots using visual information to locate a target of interest and to close the control-loop for robust and accurate snake-arm robot operations. In embodiments described herein, one or more cameras mounted on a robot head of a snake-arm robot obtain(s) visual data which is then processed using simplified dynamics models to create a solution that can be used to automatically adapt the body configuration of the snake-arm robot during operation to accurately perform tasks. Thus, some embodiments include a camera mounted on the head of a snake-arm robot that continuously records images of the workspace and the workpiece. Given a snake-arm robot pose for an operational task, a processor can utilize the image data to generate a corresponding image associated with that pose and can then compute desired velocities in the Cartesian space for the head of the snake-arm robot to move, wherein the connection between the Cartesian space and the image space is the image Jacobian.

Figure 1:
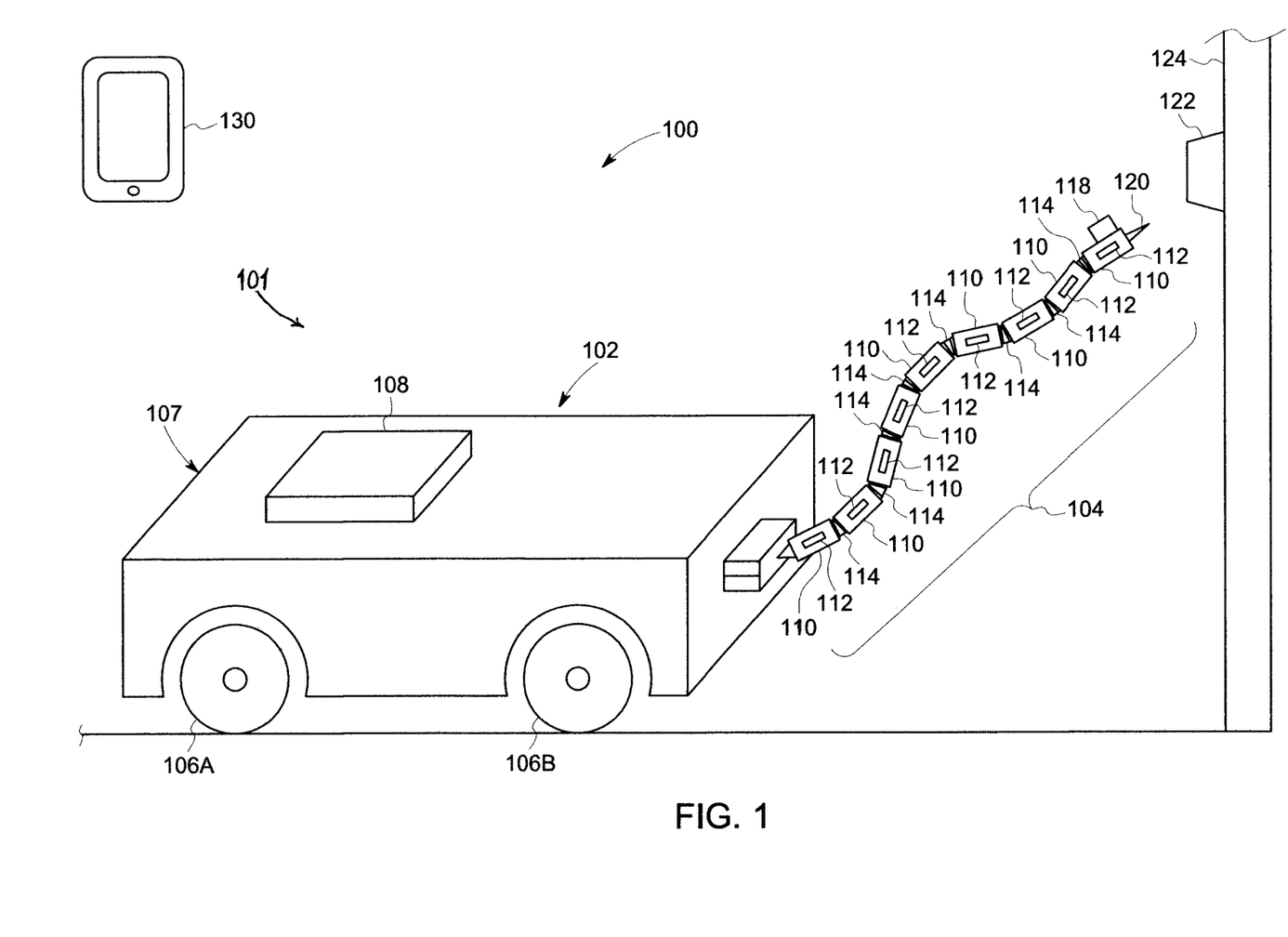
FIG. 1 illustrates an embodiment of a snake-arm robot system in accordance with embodiments of the disclosure.

FIG. 1 illustrates an embodiment of a snake-arm robot system 100 in accordance with the disclosure. The snake-arm robot system 100 includes a snake-arm robot 101 and a user device 130. The user device 130 may be a wireless device such as a laptop computer, a mobile telephone, a tablet computer, and the like, or any other electronic device having wireless communications capability. The snake arm robot 101 includes a vehicle 102 (or introduction device) and an associated snake-arm 104. The vehicle 102 includes wheels 106A and 106B, a drive motor (not shown) within a chassis 107, and a server computer 108. The snake-arm 104 includes a plurality of links 110 that each includes a controller 112 and a joint 114 between adjacent links. Each controller 112 can control a servomotor (not shown) which imparts a motion based on a serpenoid curve to an associated joint 114 of the snake-arm 104. In addition, a robot head 116 includes at least one camera 118 and a tool 120 that can be used to perform work on a workpiece 122 (which in this example is affixed to a wall 124).

The server computer 108 may include one or more processors, one or more communications components, and at least one storage device (not shown), wherein the storage device includes instructions configured to cause the server computer 108 to operate in the manner disclosed. For example, in some embodiments the server computer 108 receives input from the user device 130 regarding a desired pose of the snake-arm robot 100, which may be input by a user utilizing a user interface, in order to perform a function and/or do work on the workpiece 122. In addition, the server computer 108 receives continuous image data from the camera 118 which can include environment data and workpiece 122 data. Thus, based on the desired pose data and the image data, in some embodiments the server computer 108 generates movement instructions or control data signals and then transmits the movement instructions to one or more of the controllers 112 and/or to the vehicle drive motor which cause the vehicle 102 and snake-arm 104 to move in a desired direction and at a desired speed resulting in moving the robot head 116 to a desired position or desired pose.

The camera 118 may be an RGB sensor ("red, green, blue" sensor) which operates to extract RGB-based texture information, proximity information related to the surface of an object or objects, and temperature information (using infrared signals). In some embodiments, RGB-based texture data, proximity data, and/or temperature data is extracted simultaneously using, for example, a RGB-D camera (a camera that extracts color and dense depth images). However, in many applications, an RGB camera is adequate to provide data for visual servoing (which may be abbreviated as "VS"), which is defined as vision-based robot control which uses feedback information extracted from an image sensor to control the motion of a robot. The image sensor (or sensors) 118 can be mounted on the robot head 116 of the snake-arm 104, wherein the angle(s) and/or location(s) of the mounting position is/are flexible. In addition, in some embodiments the sensory information obtained from the camera 118 is processed on-board using hardware components, for example, system on chip (SoC) circuitry (not shown), or field-programmable gate array (FPGA) circuitry (not shown) or the like, and/or by using software algorithms.

As mentioned earlier, snake-arm robots are typically required to operate or do work on a target object located at a specific location in a confined environment, and to have the robot head engage with the target object in a particular orientation. However, accurately measuring the position of the robot head with regard to the target object is not straightforward because errors in calibration can occur, and because many work environments introduce "noise" which detrimentally affects sensor measurement data. Therefore, referring again to FIG. 1, in embodiments described herein the server computer 108 receives optical or visual data from the camera 118 (which may be an optical sensor) which is associated with the operating environment and/or the location of the workpiece 122. The server computer 108 also receives input data from a user device (not shown, which may be a laptop computer, a mobile device, or other electronic device operated by a user), wherein the input data describes a desired pose of the snake-arm robot 100 and the robot head 116, which may include a tool 120. The difference between the desired image, which is associated with the desired pose, and the real-time captured image, will be used to compute a desired velocity using image Jacobians. The server computer 108 then translates a desired velocity of the robot head into incremental displacement data and rotation data within a control cycle, which is based on the visual data and the input data. Next, all the positions of the links 110 located after the robot head 116 are computed to follow the motion of the robot head 116. A forward dynamics model is then applied to compute the current position of all the links 110 of the robot snake-arm 104. Next, the server computer 108 utilizes an incremental dynamics model to compute the force and torques required to move each of the joints 114 when the snake-arm robot 100 is to move to a desired configuration or pose. The server computer 108 then generates movement commands and transmits the movement commands to a drive motor (not shown) of the vehicle 102 and to the controllers 112 to cause servomotors (not shown) within the joints 114 of the snake-arm 104 to move so that the snake-arm robot 100 will move to the desired pose. Accordingly, by using the methods described herein, the image data provided by the camera 118 and the input data provided by the user can be utilized to automatically move the snake-arm robot 100, and specifically the robot head 116, to a desired pose to either be in position to do work or to be in a position to perform work without requiring data from encoders (which would otherwise be required on the joints 114 to provide location data).

Figure 2:
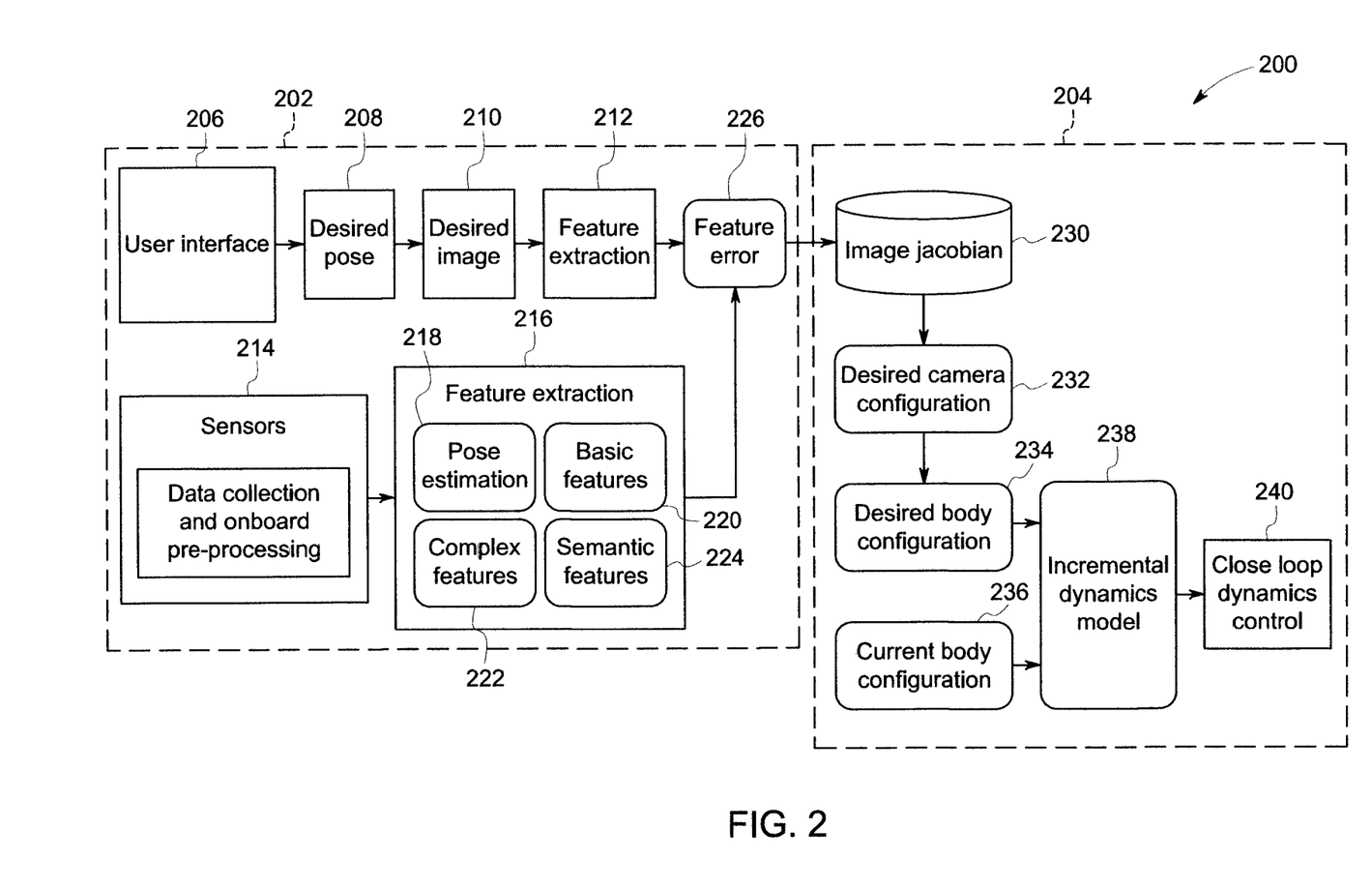
FIG. 2 illustrates a system framework including a first stage and a second stage in accordance with embodiments of the disclosure.

FIG. 2 illustrates a system framework 200 which includes a first stage 202 and a second stage 204 in accordance with the disclosure. The first stage 202 includes a user interface 206 enabling a user to provide input information associated with a desired pose 208 of the robot head, and in some implementations a processor then generates a desired image 210 (which may be displayed to the user), and performs feature extraction 212 associated with that desired image 210. The first stage 202 also includes a sensing system 214 having one or more sensors that collect image data of an object and perform onboard pre-processing of the data. The sensing system 214 extracts features 216 from the image data obtained from the work environment, wherein the features 216 can include a pose estimation 218, basic features 220, complex features 222, and semantic features 224. The first stage 202 then calculates a feature error 226 between the desired image and a real-time captured image based on the correspondence of features.

Referring again to FIG. 2, the second stage 204 receives the feature error data 226 and generates an image Jacobian matrix 230 for a desired head pose (which will be explained in more detail below). Information from the image Jacobian matrix 230 is then utilized to determine desired camera configuration data 232 and a desired body configuration data 234, which along with a current body configuration data 236 is utilized to generate an incremental dynamics model 238 which is then utilized to implement closed-loop dynamics control 240 of the snake-arm robot. An embodiment of the overall process is described in more detail below.

In FIG. 2, given a desired robot head position 208 and a three-dimensional (3D) model of the target object and its surrounding environment, a desired image 210 can be generated which is associated with the desired position of the robot head. In some embodiments, the desired image 210 may be displayed to the user. This desired image 210 is the same as the one that would be captured by a camera if the snake-arm robot "actually" moved so that the robot head is in the desired position within the 3D work environment. Depending on the mounting location of the camera 118 on the robot head 116 (See FIG. 1), the transformation data between the camera 118 and the robot head 116 may be different, which may cause different desired images to be generated. Thus, there are two approaches for generating an accurate desired image. The first approach is to generate an image in a simulation environment by moving a simulated robot head with a simulated camera to the desired position and then taking a picture by using the simulated camera. The second approach is to generate an image in a projected 3D image environment by using projective geometry, as described below.

The intrinsic matrix is parameterized as:

$$K = \begin{bmatrix} f_x & s & x_0 \\ 0 & f_y & y_0 \\ 0 & 0 & 1 \end{bmatrix} \quad (1)$$

where $f_x$ and $f_y$ are focal lengths, $x_0$ and $y_0$ are principal point offset, and s is the Axis Skew. With a known world model and a known snake-arm robot position, the points in the 3D world model can be projected to pixels on a two-dimensional (2D) image plane using the following equation:

$$P = K \times [t] \quad (2)$$

where R is the rotation and t is the translation vector; then $$\begin{bmatrix} u \\ v \\ 1 \end{bmatrix} = P \begin{bmatrix} x \\ y \\ z \\ 1 \end{bmatrix}.$$

The desired image data 210 and the real-time captured images data (by the sensors on the robot head) are then analyzed online or offline to extract features 216. The feature extraction data can represent images data such as basic features 220 such as corners, edges, lines, or planes, and up to high-level semantic feature 224 representations. With regard to basic features 220, conventional computer vision technology can be applied to analyze image data and then obtain the corners, edges, lines, and planes. These basic features are associated with descriptors for further processing or matching.

With regard to complex features 222, the basic features can be combined together to form a set, which set of features may be more reliable for robots to use for further processing. In addition, the distribution or principals of the complex features can be analyzed to generate more robust descriptors. Features can also be used to describe a segmented object, and then the segmentation data and feature extraction data can be computed in an iterative manner to enhance reliability. In some embodiments, tracking algorithms can also be utilized to obtain complex features data together with segmentation data.

With regard to pose estimation 218, given a desired image, robots can estimate the pose of the objects or the image in 3D space (or the work environment). The benefits of estimating the pose include completing an overall understanding about the geometrical information of the target object(s) in the environment, which is more robust than pure feature-based approaches.

Regarding semantic feature data 224, semantic representations may include the semantic names, geometrical and affordance relationship among objects, spatial descriptions, and the like. Such semantic information can be represented by various data structures, including entries in a database, a graph, a tree, and the like. Using such an approach can largely improve the system performance and increase reliability.

A feature refinement process may also be utilized, wherein the estimated 6D poses are used to refine the extracted features on images. 6D poses include the 3-dimensional position and the 3-dimensional rotation. Referring to equation (2) above, the 3D position is represented as t and the 3D rotation is represented as R. In addition, using equation (1) and equation (2) above, the locations of the pixels on the images can be determined, and then the pixels can be further analyzed to get refined. The detected features are projected back into the images based on the 6D poses. The comparison between the detected features and the projected features are used to re-estimate the estimated pose and also remove some false detected features. In addition, using equation (1) and equation (2) above, the locations of the pixels on the images can be determined, and then the pixels can be further analyzed to get refined. The detected features are projected back into the images based on the 6D poses. The comparison between the detected features and the projected features are used to re-estimate the estimated pose and also remove some false detected features. In some embodiments, false detection data, and ignored features data can be further processed to provide more robust overall representations.

Referring again to FIG. 2, as mentioned above the second stage 204 receives the feature error data 226 and generates an image Jacobian matrix 230 for a desired head pose. In particular, the feature error can be obtained by computing the error of the features on the images. The error between two consecutive images divided by the timing interval gives us the velocities of features on images.

$$\begin{pmatrix} \dot{u} \\ \dot{v} \end{pmatrix} = \begin{pmatrix} e_u/dt \\ e_v/dt \end{pmatrix} = \begin{pmatrix} (F_u(t) - F_u(t-1))/dt \\ (F_v(t) - F_v(t-1))/dt \end{pmatrix} \quad (3)$$

where $F_u(t)$ and $F_v(t)$ are the locations of the features on images at time step t.

Figure 3A:
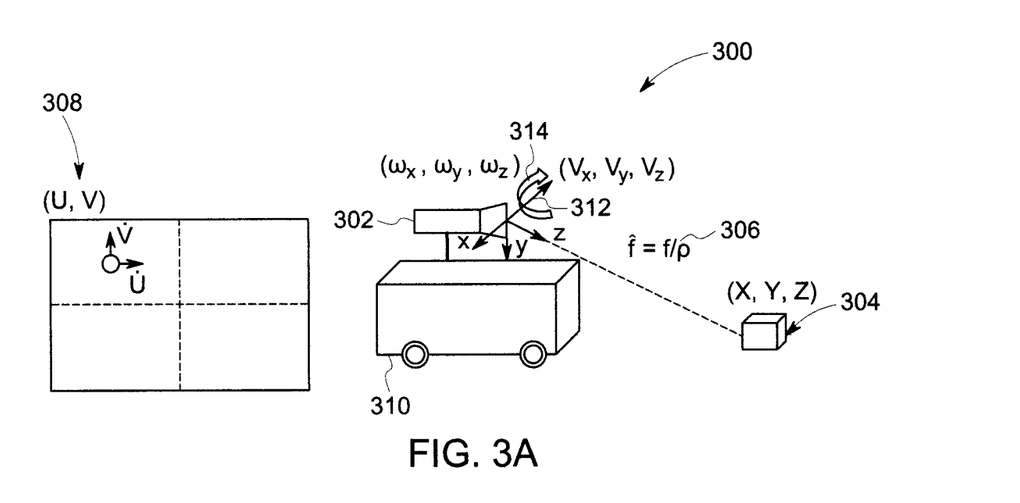
FIG. 3A illustrates an example of a perspective imaging system using the image Jacobian in accordance with methods described herein.

FIG. 3A is an example of a perspective imaging system 300 using the image Jacobian in accordance with methods described herein. A camera 302 is pointed at an object 304, and a coordinate frame "C" is associated with the camera, and the coordinate of the object 304 is expressed with regard to the camera coordinate frame. In the focal length equation 306, "f hat" represents the focal length of the lens in units of meters divided by the dimensions of the pixel, which is in units of meters per pixel (and thus the focal length here is expressed in units per pixel). The coordinate (u,v) 308 is the projection of the object 304 onto a two-dimensional plane. In this example, the camera 302 is shown attached to a vehicle 310 (which may represent a snake-arm robot) that can be moving in the direction of arrow 312 with a velocity ($v_x$, $v_y$, $v_z$), and which can also rotate in the direction of arrow 314 with an angular velocity ($w_x$, $w_y$, $w_z$).

Figure 3B:
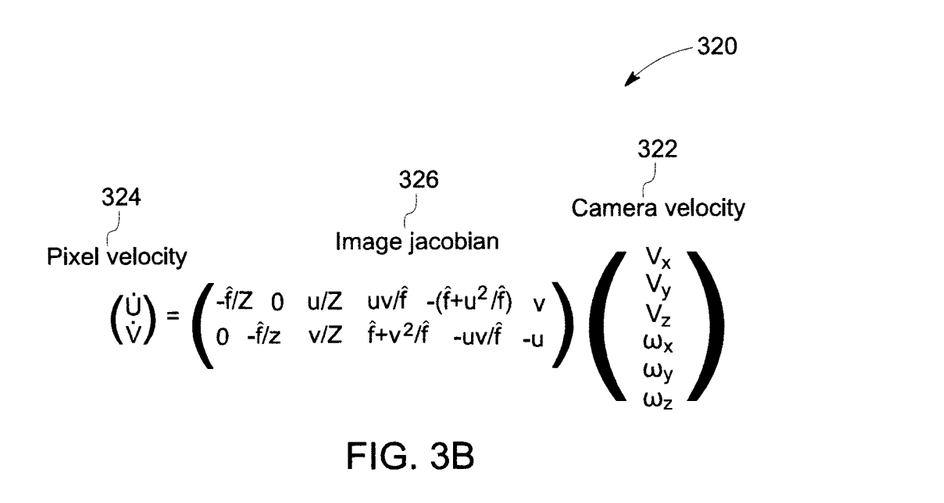
FIG. 3B illustrates a known expression relating the velocity of a camera to the pixel velocity in the image plane which are related by a Jacobian matrix.

FIG. 3B illustrates a known expression 320 relating the velocity of the camera 322 to the pixel velocity 324 in the image plane, and these two quantities are related by a Jacobian matrix 326, which here is a two by six matrix. The camera's spatial velocity has a translational component and a rotational component, which when multiplied by the image Jacobian matrix provides the pixel velocity in the image plane, which is that velocity that the point (u, v) (See FIG. 3A) in the image plane appears to move.

With regard to the desired camera direction 232 in stage two of FIG. 2, the goal is to move the features to a certain point in the image space. Thus, given a desired pose of the camera, the desired location of the features on images can be computed. Equation (3) above can be rewritten as:

$$\begin{pmatrix} e_u \\ e_v \end{pmatrix} = \begin{pmatrix} F_u(\text{desired}) - F_u(\text{current}) \\ F_v(\text{desired}) - F_v(\text{current}) \end{pmatrix} \quad (5)$$

The control signal is then computed as:

$$\begin{pmatrix} C(e_u) \\ C(e_v) \end{pmatrix} = \begin{pmatrix} P*e_u + P_i * \int e_u + d(P_d e_u)/dt \\ P*e_v + P_i * \int e_v + d(P_d e_v)/dt \end{pmatrix} \quad (6)$$

Considering all the feature points, a group of control commands on $C(e_u)$ and $C(e_v)$ is obtained. A weighted sum of all the control commands are then computed to have the final control commands in the image space.

$$\begin{pmatrix} V_u \\ V_v \end{pmatrix} = \begin{pmatrix} \sum_{i=1}^{N} W_i C(e_u)_i \\ \sum_{i=1}^{N} W_i C(e_v)_i \end{pmatrix} \quad (7)$$

Using equation (4), the velocities in the Cartesian space are:

$$V_{xyz} = [V_x, V_y, V_z, \omega_x, \omega_y, \omega_z]^T \quad (8)$$

With regard to the desired body configuration 234 (see FIG. 2), the desired camera pose can be computed incrementally using the velocities as follows:

$$x(t) = x(t-1) + V_x dt$$

$$y(t) = y(t-1) + V_y dt$$

$$z(t) = z(t-1) + V_z dt \quad (9)$$

$$\alpha(t) = \alpha(t-1) + \omega_x dt$$

$$\beta(t) = \beta(t-1) + \omega_y dt$$

$$\gamma(t) = \gamma(t-1) + \omega_z dt$$

Then the desired camera configuration can be represented as $T^{camera}(\text{desired})$.

The desired head configuration is:
$T^{robot}(\text{desired}) = T_{camera}^{robot} T^{camera}(\text{desired})$, where $T_{camera}^{robot}$ is the fixed transformation between robot head and camera.

Accordingly, incremental dynamics control 238 (see FIG. 2) can be calculated as follows. At time 0, if all joints are supported by motor torques and the robot is static, the configuration of robots using the torques on joints can be computed. We can have the configuration description as:

$$\{\tau_0, \theta_0\} \quad (10)$$

And a well-accepted dynamics equation is:

$$\tau = M(\theta)\ddot{\theta} + C(\theta, \dot{\theta})\dot{\theta} + g(\theta) \quad (11)$$

where $M(\theta) \in \Re^{n \times n}$ is the inner mass matrix, $C(\theta\dot{\theta}) \in \Re^{n \times n}$ is related to the Coriolis and the centrifugal matrix, and $g(\theta) \in \Re^{n \times 1}$ is the the gravitational torque/force.

Computing the Jacobian again includes a linear function:

$$\dot{\tau} = J \begin{bmatrix} \theta \\ \dot{\theta} \\ \ddot{\theta} \end{bmatrix} \quad (12)$$

Wherein θ is known from static force analysis, and $\dot{\theta}$ and $\ddot{\theta}$ are computed from equation (8). Higher order derivatives of θ are ignored, and then $\dot{\tau}$ can be computed. The current on motors at the next timing step is then:

$$\tau = \tau_0 + \int \dot{\tau} dt \quad (13)$$

The loop is closed by using the visual feedback information. The configuration of the snake-arm robot will be incrementally recomputed using equations (4), (6), (7), (8), and (9). The new configuration will then be used update the equation (10) to get the torque and joint angles for the next control cycle.

All the algorithms described herein can be implemented on an edge device, such as the controllers 112 shown on each link 110 in FIG. 1 (which may be integrated circuits, such as an FGPA SOC device). As mentioned earlier, in some embodiments each of the controllers 112 is associated with a servomotor (not shown) that is operable to move an associated joint 114 of the snake arm 104 to thus cause the robot head to move to the desired pose.

Figure 4:
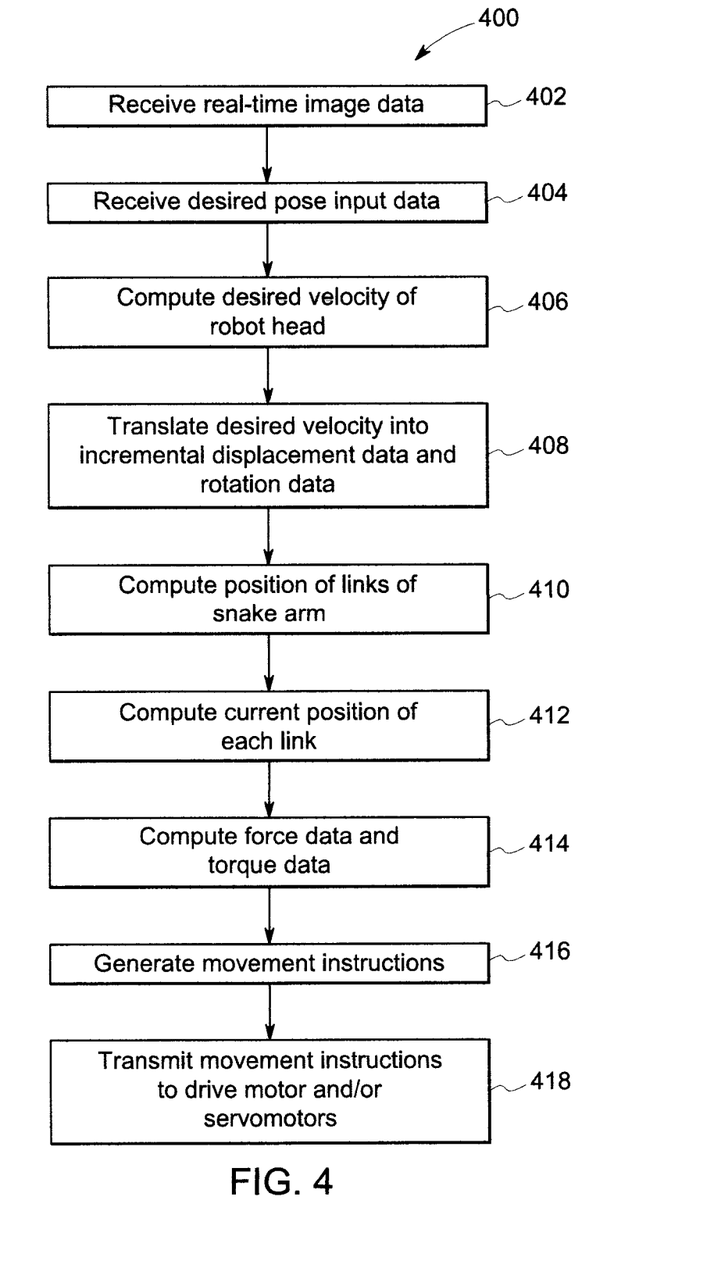
FIG. 4 illustrates a flowchart of process for using optical data to dynamically control a snake-arm robot according to some embodiments.

FIG. 4 illustrates a flowchart of process 400 for using optical data to dynamically control a snake-arm robot according to some embodiments. A server computer receives 402 from at least one optical sensor mounted on a robot head of a snake-arm robot, real-time image data associated with at least one of an operating environment and a location of a workpiece, and receives 404 input data describing a desired pose of the robot head from a user device. The server computer then computes 406 a desired velocity of the robot head using an image Jacobian based on the difference between the desired pose and the real-time image data, and translates 408 the desired velocity of the robot head into incremental displacement data and rotation data within a control cycle based on the image data and the input data. Next, the server computer computes 410 the position of each of a plurality of links of the snake-arm to follow the motion of the robot head; computes 412 a current position of each of the plurality of links utilizing a forward dynamics model; and computes 414, using an incremental dynamics model force, force and torque data required to move at least one of the plurality of joints connecting the links of the snake arm so that the snake-arm robot moves to the desired pose. The server computer then generates 416 movement instructions based on the force and torque data, and transmits 418 the movement instructions to at least one of a drive motor associated with an introduction device and a plurality of controllers associated with servo-motors operably connected to joints connecting the links of the snake arm causing the robot head to move to the desired pose.

Accordingly, disclosed herein is a method and system for automatically controlling a snake-arm robot utilizing visual data obtained from an optical sensor, such as a camera, mounted on a robot head. The challenges that have been overcome include implementing visual servoing for snake-arm robots, dynamic control without the use of encoders, closing the loop for both visual information and dynamics information, estimating snake-arm robot configuration based on force and/or torque data, and overall snake-arm robot control system design and integration. Specifically, a key aspect is the use of visual feedback data and incremental dynamics control data for controlling a snake-arm robot. The visual servoing control loop advantageously increases the performance of the system by taking external feedback into the control, which also beneficially improves the overall accuracy of the system. In addition, the use of one additional resource in addition to the internal sensors improves the robustness of the system along with improving the accuracy of the snake-arm robot. Moreover, since the control loop is a closed system that uses visual feedback information and the incremental dynamics model, calibration of the snake-arm robot system is unnecessary for field testing and for other applications, resulting in a significant time savings for onsite work. Yet further, the disclosed system level design can be utilized with conventional snake-arm robots (that do not include encoders) for many types of commercial applications including, but not limited to, visual information-based operations such as repairing aircraft engines, maintaining industrial equipment, transporting materials within confining environments, manufacturing parts, and the like.

Accordingly, the methods and apparatus described herein significantly improves the performance of conventional snake arm robotic systems by automatically providing control data for moving a snake-arm robot to locate a target and closes the control loop for robust and accurate operations. In addition, the methods disclosed herein use external image information to close the control loop and provide an incremental dynamics model, which enables the snake-arm robot to perform many different types of operations in different environments. In addition, conventional snake-arm robots must be calibrated to the environment before executing operations, which is expensive and time consuming, whereas the described process does not require d calibration is not required when utilizing the disclosed methods which saves time and costs for customers.

This detailed description uses examples to disclose the invention and also to enable any person skilled in the art to practice the invention, including making and using any devices or systems and performing any incorporated methods. The scope of the invention is defined by the claims, and may include other examples that occur to those skilled in the art. Such other examples are contemplated as being within the scope of the claims if they have structural elements that do not differ from the literal language of the claims, and/or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and/or techniques in accordance with principles disclosed herein.

Accordingly, the present invention has been described in terms of several embodiments solely for the purpose of illustration. Persons skilled in the art will recognize from this description that the invention is not limited to the embodiments described, but may be practiced with modifications and/or alterations limited only by the spirit and scope of the appended claims.

What is claimed is:

1. A method for controlling a snake-arm robot, comprising:
   receiving, by a server computer from at least one optical sensor mounted on a robot head of a snake-arm robot, real-time image data associated with at least one of an operating environment and a location of a workpiece;
   receiving, by the server computer from a user device, input data describing a desired pose of the robot head;

computing, by the server computer, a desired velocity of the robot head using an image Jacobian based on the difference between the desired pose and the real-time image data;

translating, by the server computer based on the image data and the input data, the desired velocity of the robot head into incremental displacement data and rotation data within a control cycle;

computing, by the server computer, a position of each of a plurality of links comprising a snake-arm of the snake-arm robot to follow motion of the robot head;

computing, by the server computer, a current position of each of the plurality of links utilizing a forward dynamics model;

computing, by the server computer using an incremental dynamics model, force and torque data required to move at least one of a plurality of joints connecting the links to move the snake-arm robot to the desired pose;

generating, by the server computer, movement instructions based on the force and torque data; and transmitting, by the server computer, the movement instructions to at least one of a drive motor associated with an introduction device and a plurality of controllers associated with servo-motors operably connected to joints connecting the links of the snake arm causing the robot head to move to the desired pose.

2. The method of claim 1, further comprising, prior to computing a desired velocity of the robot head using an image Jacobian:

extracting, by the server computer, feature data from the real-time image data and desired image data associated with the desired pose of the robot head; and refining, by the server computer utilizing a feature refinement process, an estimated pose of the robot head.

3. The method of claim 2, wherein refining the estimated pose of the robot head comprises at least one of re-estimating the estimated pose of the robot head and removing false detected features.

4. The method of claim 2, wherein the extracted feature data comprises at least one of basic features data, pose estimation data, complex features data and semantic features data.

5. The method of claim 1, wherein the at least one optical sensor comprises an RGB sensor.

6. The method of claim 1, further comprising, after receiving the desired pose input data:

generating, by the server computer, desired image data associated with a desired position of the robot head; and transmitting, by the server computer, the desired image data to the user device enabling the user device to display an image associated with the desired position of the robot head.

7. The method of claim 6, wherein generating the desired image data comprises generating an image in a simulation environment by:

moving, by the server computer, a simulated robot head with a simulated camera to the desired position; and taking, by the server computer, a picture with the simulated camera.

8. The method of claim 6, wherein generating the desired image data comprises generating an image in a projected 3-D environment.

9. The method of claim 8, wherein generating the image in the projected 3-D environment comprises projecting, by the server computer using a known world model and a known snake-arm robot position, data points in the 3D world model to pixels on a two-dimensional (2D) image plane by using P=K×[R|t] where R is the rotation and t is the $$\begin{bmatrix} u \\ v \\ 1 \end{bmatrix} = P \begin{bmatrix} x \\ y \\ z \\ 1 \end{bmatrix}.$$

translation vector, and then.

10. A dynamically controlled snake-arm robot system, comprising:
a user device; and
a snake arm robot comprising:
a vehicle having a drive motor;
a snake arm operably connected to the vehicle and comprising a plurality of links, controllers, joints, servomotors, and a robot head, wherein the robot head further comprises at least one optical sensor and a tool mounted thereon; and
a server computer connected to the vehicle, wherein the server computer is operably connected to the drive motor and to the plurality of controllers, the server computer comprising a storage device including instructions causing the server computer to:
receive real-time image data associated with at least one of an operating environment and a location of a workpiece from the at least one optical sensor mounted on the robot head;
receive input data from the user device describing a desired pose of the robot head;
compute a desired velocity of the robot head using an image Jacobian based on the difference between the desired pose and the real-time image data;
translate, based on the image data and the input data, the desired velocity of the robot head into incremental displacement data and rotation data within a control cycle;
compute a position of each of the plurality of links to follow motion of the robot head;
compute a current position of each of the plurality of links utilizing a forward dynamics model;
compute, using an incremental dynamics model, force and torque data required to move at least one of the plurality of joints connecting the links to move the snake-arm robot to the desired pose;
generate movement instructions based on the force and torque data; and
transmit the movement instructions to at least one of the drive motor of the vehicle and to the plurality of controllers associated with servo-motors of the snake arm causing the robot head to move to the desired pose.

11. The system of claim 10, wherein the at least one optical sensor comprises an RGB sensor.

12. The system of claim 10, wherein the user device comprises one of a laptop computer, a tablet computer and a mobile telephone.

13. The system of claim 10, wherein the storage device of the server computer includes further instructions, prior to the instructions for computing a desired velocity of the robot head using an image Jacobian, causing the server computer to:

extract feature data from the real-time image data and desired image data associated with the desired pose of the robot head; and refine, utilizing a feature refinement process, an estimated pose of the robot head.

14. The system of claim 13, wherein the instructions for refining the estimated pose of the robot head comprises instructions causing the server computer to at least one of re-estimating the estimated pose of the robot head and removing false detected features.

15. The system of claim 13, wherein the instructions for extracting feature data comprises instructions causing the server computer to extract at least one of basic features data, pose estimation data, complex features data and semantic features data.

16. The system of claim 10, wherein the storage device of the server computer includes further instructions, subsequent to the instructions for receiving the desired pose input data, causing the server computer to:
generate desired image data associated with a desired position of the robot head; and
transmit the desired image data to the user device enabling the user device to display an image associated with the desired position of the robot head on a display screen.

17. The system of claim 16, wherein the instructions for generating the desired image data comprises instructions for generating an image in a simulation environment, causing the server computer to:
move a simulated robot head with a simulated camera to the desired position; and
take a picture with the simulated camera.

18. The system of claim 16, wherein the instructions for generating the desired image data comprises instructions causing the server computer to generate an image in a projected 3-D environment.

19. The system of claim 18, wherein the instructions for generating the image in the projected 3-D environment comprises instructions causing the server computer to project, using a known world model and a known snake-arm robot position, data points in the 3D world model to pixels on a two-dimensional (2D) image plane by using P=K×[R|t] where R is the rotation and t is the translation vector, and then $$\begin{bmatrix} u \\ v \\ 1 \end{bmatrix} = P \begin{bmatrix} x \\ y \\ z \\ 1 \end{bmatrix}.$$

20. A non-transitory, computer-readable medium storing instructions that, when executed by a computer processor, causes dynamic control of a snake-arm robot, the method comprising:
receiving real-time image data associated with at least one of an operating environment and a location of a workpiece from at least one optical sensor mounted on a robot head of a snake-arm robot;
receiving input data from a user device describing a desired pose of the robot head;
computing a desired velocity of the robot head using an image Jacobian based on the difference between the desired pose and the real-time image data;
translating, based on the image data and the input data, the desired velocity of the robot head into incremental displacement data and rotation data within a control cycle;
computing a position of each of a plurality of links comprising a snake-arm of the snake-arm robot to follow motion of the robot head;
computing a current position of each of the plurality of links utilizing a forward dynamics model;
computing, using an incremental dynamics model, force and torque data required to move at least one of a plurality of joints connecting the links to move the snake-arm robot to the desired pose;
generating movement instructions based on the force and torque data; and
transmitting the movement instructions to at least one of a drive motor associated with an introduction device and a plurality of controllers associated with servomotors operably connected to joints connecting the links of the snake arm causing the robot head to move to the desired pose.

* * * * *